United States Patent [19]
Dao et al.

[11] Patent Number: 5,674,463
[45] Date of Patent: Oct. 7, 1997

[54] PROCESS FOR THE PURIFICATION OF CARBON DIOXIDE

[75] Inventors: Loc H. Dao, Bound Brook; Clair Wheeler, Basking Ridge, both of N.J.

[73] Assignee: The BOC Group, Inc., New Providence, N.J.

[21] Appl. No.: 296,377

[22] Filed: Aug. 25, 1994

[51] Int. Cl.$^6$ .................... C01B 17/02; C01B 17/16
[52] U.S. Cl. ................ 423/230; 423/231; 423/244.01; 423/244.06; 423/564; 423/573.1
[58] Field of Search ................ 423/573.1, 564, 423/244.06, 230, 231, 244.01

[56] References Cited

U.S. PATENT DOCUMENTS

| | | | |
|---|---|---|---|
| 1,816,533 | 7/1931 | Huff et al. | 423/573.1 |
| 2,972,522 | 2/1961 | Urban | 423/573.1 |
| 3,058,800 | 10/1962 | Frevel et al. | 423/564 |
| 3,441,370 | 4/1969 | Gutmann et al. | 423/230 |
| 3,649,169 | 3/1972 | Nicklin et al. | 423/564 |
| 4,311,680 | 1/1982 | Frech et al. | 423/231 |
| 4,332,781 | 6/1982 | Lieder et al. | 423/573 |
| 4,363,790 | 12/1982 | Anderson et al. | 423/573.1 |
| 4,382,912 | 5/1983 | Madgavkar et al. | 423/231 |
| 4,435,371 | 3/1984 | Frech et al. | 423/573.1 |
| 4,478,800 | 10/1984 | van der Wal et al. | 423/231 |
| 4,511,668 | 4/1985 | Nozue et al. | 423/564 |
| 4,521,387 | 6/1985 | Broecker et al. | 423/230 |
| 4,623,533 | 11/1986 | Broecker et al. | 423/564 |
| 4,668,491 | 5/1987 | Wimmer et al. | 423/564 |
| 4,861,566 | 8/1989 | Denny | 423/230 |
| 4,871,710 | 10/1989 | Denny et al. | 423/244.06 |
| 4,888,157 | 12/1989 | Carnell et al. | 423/230 |
| 5,104,630 | 4/1992 | Holmes et al. | 423/242 |
| 5,152,970 | 10/1992 | van der Wal et al. | 423/231 |
| 5,244,641 | 9/1993 | Khare | 423/231 |

FOREIGN PATENT DOCUMENTS 952555   7/1962   United Kingdom ............ 423/564

*Primary Examiner*—Wayne Langel
*Attorney, Agent, or Firm*—Coleman R. Reap; Salvatore P. Pace

[57] ABSTRACT

Sulfur compounds are removed from gaseous carbon dioxide by contacting the carbon dioxide with water vapor in the presence of a carbonyl sulfide hydrolysis catalyst, thereby converting carbonyl sulfide in the gas stream to hydrogen sulfide, contacting the resulting gas stream with ferric oxide, thereby removing hydrogen sulfide from the gas stream as elemental sulfur, and contacting the remaining gas stream with copper oxide, zinc oxide or mixtures of these, thereby removing any remaining sulfur compounds from the gaseous carbon dioxide.

5 Claims, 2 Drawing Sheets

PROCESS FOR THE PURIFICATION OF CARBON DIOXIDE

FIELD OF THE INVENTION

This invention relates to the purification of carbon dioxide and more particularly to the removal of sulfur compounds from a gaseous carbon dioxide stream.

BACKGROUND OF THE INVENTION

Carbon dioxide is used in a number of industrial and domestic applications, many of which require the carbon dioxide to be free from impurities. Unfortunately carbon dioxide obtained from natural sources, such as natural gas, or produced in industry, particularly carbon dioxide produced by the combustion of hydrocarbon products, often contains impurity levels of sulfur compounds, such as carbonyl sulfide (COS) and hydrogen sulfide ($H_2S$). When the carbon dioxide is intended for use in an application that requires that the carbon dioxide be of high purity, such as in the manufacture of foodstuffs or medical products, the sulfur compounds and other impurities contained in the gas stream must be removed prior to use.

Various methods for removing sulfur compounds from gases such as carbon dioxide are known. For example, U.S. Pat. No. 4,332,781, issued to Lieder et al., discloses the removal of COS and $H_2S$ from a gas stream by first removing the $H_2S$ from the hydrocarbon gas stream by contacting the gas stream with an aqueous solution of a regenerable oxidizing reactant, which may be a polyvalent metallic ion, such as iron, vanadium, copper, etc., to produce a COS-containing gas stream and an aqueous mixture containing sulfur and reduced reactant. The COS in the gas stream is next hydrolyzed to $CO_2$ and $H_2S$ by contacting the gas stream with water and a suitable hydrolysis catalyst, such as nickel, platinum, palladium, etc., after which the $H_2S$ and, if desired, the $CO_2$ are removed. This step can be accomplished by the earlier described $H_2S$ removal step or by absorption. The above-described process involves the use of cumbersome and costly equipment and liquid-based systems which require considerable attention and may result in the introduction of undesirable compounds, such as water vapor, into the carbon dioxide product.

Similarly, U.S. Pat. No. 5,104,630, issued to Holmes et al., discloses the removal of COS from a hydrocarbon gas stream, such as natural gas, by converting the COS to $H_2S$ and $CO_2$ by contacting the gas stream in countercurrent flow with a warm lean aqueous solution which contains an alkaline absorbent, such as diethanolamine (DEA). The $H_2S$-rich gas stream is then contacted with a cool lean aqueous solution of the alkaline absorbent, thereby absorbing the $H_2S$ and $CO_2$. The $H_2S$- and $CO_2$-rich aqueous absorbent is then regenerated to remove the $H_2S$ and $CO_2$ therefrom, and the regenerated aqueous solution is recycled. In addition to the disadvantages mentioned above, the alkaline solution used in the process of this patent absorbs $CO_2$ in addition to $H_2S$ and is therefore unsuitable for the purification of $CO_2$.

It is known to directly remove sulfur compounds, such as COS and $H_2S$ from a gas stream by contacting the gas stream with metal oxides, such as copper oxide, zinc oxide or mixtures of these, but this process is only economically feasible when these impurities are present in a gas stream in trace amounts, since the catalyst is non-regenerable and expensive.

Since many end users of carbon dioxide require the carbon dioxide they use to be substantially free of sulfur compounds, and because natural sources of carbon dioxide and industrially manufactured carbon dioxide often contain sulfur compounds, economic and efficient methods for effecting substantially complete removal of sulfur compounds from carbon dioxide gas streams, without concomitantly introducing other impurities into the carbon dioxide, are continuously sought. The present invention provides a simple and efficient method of achieving this objective.

SUMMARY OF THE INVENTION

Sulfur compounds, such as carbonyl sulfide and hydrogen sulfide are removed from a carbon dioxide gas stream by a multistep process comprising: a first principal step in which carbonyl sulfide is hydrolyzed to hydrogen sulfide and carbon dioxide by contacting the gas stream with water vapor in the presence of an hydrolysis catalyst; and a second principal step in which hydrogen sulfide in the gas stream is converted to elemental sulfur and/or metal sulfides, which are removed from the gas stream.

The hydrolysis catalyst may be activated alumina or it may comprise a noble metal such as platinum, palladium, rhodium, nickel, etc., mounted on a substrate such as alumina, silica, etc. In a preferred embodiment, the hydrolysis catalyst is activated alumina.

The oxidation of hydrogen sulfide is conducted in the presence of a non-regenerable metal oxide catalyst/sorbent. The oxidation catalyst is preferably iron oxide, and it may be supported or unsupported.

In a preferred embodiment of the invention the process includes a third principal step in which residual sulfur compounds, including unreacted carbonyl sulfide and hydrogen sulfide are removed from the gas stream by contacting the gas stream with a metal oxide selected from copper oxide, zinc oxide or mixed oxides of copper and zinc.

In another preferred embodiment the carbonyl sulfide hydrolysis step is preceded by a prepurification step to remove impurities that may adversely affect one or more of the principal steps of the process of the invention. Appropriate prepurification procedures include filtration to remove solid impurities and adsorption and/or distillation to remove nonfilterable impurities, such as hydrocarbons and stabilizing compounds from the feed stream.

DETAILED DESCRIPTION OF THE INVENTION

Figure 1:
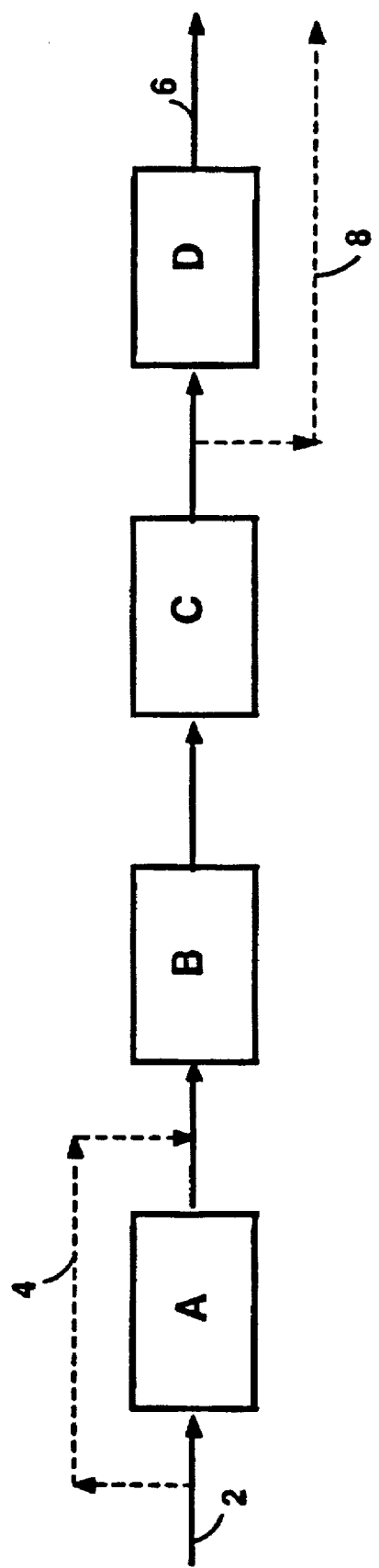
FIG. 1 illustrates, in a block diagram, one embodiment of a system for removing sulfur compounds from a carbon dioxide gas stream in accordance with the present invention.

The process of the invention is useful for purifying carbon dioxide gas streams, such as is obtained from a combustion process or a natural gas separation process. The invention is useful for removing sulfur compounds, such as carbonyl sulfide, hydrogen sulfide, carbon disulfide, etc. for a crude carbon dioxide gas stream, i.e. a stream comprising at least about 90 volume percent carbon dioxide, with the remainder being impurities such as sulfur compounds, hydrocarbons, nitrogen, argon, moisture etc. The invention is particularly suitable for removing sulfur compound impurities from a relatively pure carbon dioxide gas stream.

In general, the process comprises as principal steps a carbonyl sulfide hydrolysis step and a hydrogen sulfide oxidation step. It may also comprise a polishing step to remove trace amounts of sulfur compounds that remain in the gas stream following the carbonyl sulfide hydrolysis and hydrogen sulfide oxidation steps and one or more prepurification steps to remove various other impurities in the gas stream.

The first principal step of the invention is the hydrolysis of carbonyl sulfide to hydrogen sulfide and carbon dioxide. The equation representing the hydrolysis reaction is:

$$COS+H_2O \rightleftharpoons H_2S+CO_2$$

The hydrolysis reaction is carried out in the gas phase by contacting a mixture of the carbon dioxide feed gas and water vapor with a solid catalyst in a reaction zone. In general, the hydrolysis step is carried out using a stoichiometric excess of water, which is preferably in the form of water vapor. Since the gas stream usually contains only small amounts of COS, sufficient moisture can be provided in the form of water vapor in the feed gas stream. However, if additional moisture is necessary, it can be provided in other forms, such as by introducing steam into the hydrolysis reactor.

Any appropriate gas phase carbonyl sulfide oxidation catalyst can be used in the hydrolysis step. Suitable catalysts include nickel, platinum, palladium, cobalt, rhodium or indium, or mixtures of these can be used. The catalyst may be used without a support, or it can be deposited onto a substrate, such as alumina, silica or mixtures of these. The particular catalyst used in the hydrolysis step of the process of the invention is not critical, and the selection of appropriate hydrolysis catalysts is within the skill of workers familiar with carbonyl sulfide hydrolysis reactions.

The temperature at which the hydrolysis reaction is carried out will depend upon the composition of the feed stream, the amount of water vapor present, the particular catalyst employed in the hydrolysis, and other variables. In general, it is desirable to conduct the hydrolysis at a temperature in the range of about 0° C. to about 400° C., and preferably at a temperature in the range of about 25° to about 200° C. The pressure at which the reaction is ideally carried out will vary depending upon the above-mentioned factors, but in general ranges from about 1 to about 50 atmospheres, absolute, and is usually maintained in the range of about 1 to about 25 atmospheres, absolute. The reaction conditions are well known to those skilled in the art and do not form a part of the invention.

The hydrolysis step is also effective for hydrolyzing certain other sulfides, such as carbon disulfide, to hydrogen sulfide and carbon dioxide. Thus, this step can be used to eliminate sulfur compounds other than COS from the carbon dioxide feed stream being treated.

The second principal step of the process of the invention is the removal of hydrogen sulfide from the carbon dioxide gas stream. This step is accomplished by contacting the gaseous effluent from the carbonyl sulfide reaction zone with an inexpensive metal oxide, such as iron (III) oxide, preferable in supported particulate form. The iron oxide removes the hydrogen sulfide from the gas stream by oxidizing the sulfide to elemental sulfur, by converting the hydrogen sulfide to iron sulfides, or by a combination of these. This step serves to efficiently remove all or all but trace amounts of hydrogen sulfide from the carbon dioxide gas stream.

During the course of the reaction occurring in this step the catalyst is gradually deactivated by the accumulation of sulfur or sulfide therein. When the catalyst activity drops to the extent that it is no longer able to remove substantially all hydrogen sulfide from the gas stream, the catalyst is discarded and replaced by fresh catalyst.

As noted above, the catalyst used in this step is an inexpensive metal oxide. These catalysts are preferred because they are not only effective for the removal of hydrogen sulfide from the carbon dioxide gas stream, but are also easily disposed of. Preferred catalysts for this step include iron (III) oxide, nickel oxide, manganese dioxide, etc. The metal oxide may be substantially pure or it may be in the form of an impure ore. It may also be supported on a substrate, such as activated carbon, if desired. The most preferred catalyst is iron (III) oxide. This catalyst is preferred because it is inexpensive, is highly effective and is widely accepted for disposal in landfill sites.

The conditions at which the hydrogen sulfide removal step is carried out is not critical. In general, it is desirable to conduct this reaction at a temperature in the range of about 0° to about 200° C., and preferably at a temperature in the range of about 20° to about 100° C. It is often desirable to conduct the reaction at ambient temperature. The pressure at which the reaction is carried out is likewise not critical, and in general, the reaction is carried out at absolute pressures in the range of about 1 to about 50 atmospheres, and it is preferably carried out at absolute pressures in the range of about 1 to about 25 atmospheres. It is again stressed that the reaction conditions are well known to those skilled in the art and are not specifically part of the invention.

In a preferred embodiment of the invention, the process includes as a third principal step a final gas purification operation, which serves to remove from the carbon dioxide product stream any sulfur compounds that were not removed during the carbonyl sulfide hydrolysis and hydrogen sulfide oxidation steps. It sometimes happens that the hydrolysis and oxidation steps do not completely remove all sulfur compounds from the gas stream. This may occur, for example, when the feed gas contains high concentrations of sulfur compound impurities, or when the catalyst begins to lose activity, the latter situation being more likely to occur in the hydrogen sulfide removal step. In such cases the residual trace amounts of carbonyl sulfide, hydrogen sulfide, and perhaps other sulfur compounds remaining in the carbon dioxide product gas stream are removed in a final purification or polishing step.

The polishing step comprises passing the gas stream through a bed of metal oxide selected from copper oxide, zinc oxide or mixed copper-zinc oxides. These metal oxides effectively remove all remaining sulfur compounds from the gas stream. The cost of these oxides makes their use for the removal of considerable amounts of sulfur compound impurities prohibitive, but they are ideal for removing trace amounts of the impurities. As the gas stream passes through the bed of metal oxide substantially all of the sulfur compounds react with the catalyst so that the gas stream leaving the metal oxide bed is virtually free of sulfur compounds. The metal sulfides are non-regenerable and thus must be disposed of when they are spent.

The carbon dioxide feed gas may contain impurities such as solids, or chemical impurities that tend to poison the catalysts used in the process of the invention or render the carbon dioxide unfit for its intended purpose. It is generally desirable to remove these impurities from the gas stream prior to introducing the stream into the carbonyl sulfide hydrolysis reaction zone. This can be accomplished by passing the feed gas through one or more preliminary purification units. Typical of such units are filters, scrubbers, distillation units and hydrocarbon adsorption beds. Such units are well known and form no part of the invention, and therefore require no further description.

The invention can be better understood from the accompanying drawings, in which the same reference numeral is used to designate the same or similar equipment in different figures. Auxiliary equipment that is unnecessary for an understanding of the invention, including valves, compressors and heat exchangers, have been omitted from the drawings to simplify discussion of the invention. Turning to FIG. 1, there is illustrated therein a general scheme for removing sulfur compounds from carbon dioxide gas streams by the process of the invention. The system illustrated in FIG. 1 includes optional preliminary purification section A, COS hydrolysis section B, hydrogen sulfide removal section C, and optional gas polishing section D.

In FIG. 1, carbon dioxide feed gas entering the system through line 2 generally flows into prepurification section A, wherein impurities other than gaseous sulfur compounds are removed from the feed gas. This section may contain units which are effective to remove solid impurities from the gas stream, such as filters and/or units for the removal of gaseous impurities from the feed gas stream. Liquid removal units that can be incorporated into section A include adsorbers, absorbers, coalescers, scrubbers, distillation units, etc. for the removal of gaseous impurities, such as oxygen, light inert gases, hydrogen, hydrocarbons, organic compounds, such as lubricants, corrosion inhibitors, etc.

In some cases, it may not be necessary to prepurify the carbon dioxide feed gas. In such situations, the feed gas in line 2 can be diverted around section A through line 4, and caused to directly enter COS hydrolysis section B. Section B is a gas phase COS reactor, packed with a suitable hydrolysis catalyst, such as alumina. Section B is provided with means for introducing moisture into the gas stream entering this section, if the feed gas does not already contain sufficient moisture to cause the hydrolysis of substantially all of the COS in the feed gas. Moisture can be introduced into the feed gas by, for example, introducing steam into the gas stream, or by bubbling the gas stream through a vessel containing water. The particular means for introducing moisture into the gas stream is not critical and forms no part of the invention.

Section B is also equipped with heat exchange means to heat the incoming feed gas to the desired hydrolysis reaction temperature, which, as noted above, can range from about 0° to about 400° C., but is usually in the range of about 25° to about 200° C.

As the gas stream passes through section B, substantially all of the COS contained in the gas stream is converted to hydrogen sulfide and carbon dioxide. The hydrolysis reaction is very convenient for removing COS from the feed gas because the carbon dioxide produced in the hydrolysis does not adulterate the feed gas.

Thus, the only product of the hydrolysis that must be removed from the feed gas is the hydrogen sulfide. This is accomplished in the next step of the process.

The gas stream leaving section B next enters section C, wherein substantially all of the hydrogen sulfide present in the gas stream is removed. The hydrogen sulfide removal is effected by passing the gas stream through a bed of one of the above-mentioned inexpensive metal oxides, preferably iron (III) oxide. The reaction can takes place at temperatures of about 0° to about 200° C., but is preferably conducted at atmospheric temperatures, i.e. temperatures of about 20° to about 60° C. Accordingly, it is generally preferable to equip section C with heat exchange means to cool the gas entering this section from section B.

Section C can comprise a single reaction vessel, however, in order to provide substantially continuous processing capability it is preferable that this section include two or more reaction vessels. A particularly suitable arrangement is the two-bed "lead-lag" system, in which the hydrogen sulfide-containing carbon dioxide gas stream passes serially through first and second reaction vessels containing the metal oxide. In the startup period of the process, when both beds contain fresh catalyst, substantially all of the hydrogen sulfide is removed in the first bed. As the on-stream time of the process increases the impurity front progresses through this bed, until, finally it reaches the point at which of the hydrogen sulfide impurity begins to break through into the second bed. The gas is permitted to continue pass through the first bed and then through the second bed until the performance of the first bed reaches the point at which it no longer worthwhile passing the gas through this bed. At this point, the flow of hydrogen sulfide-containing gas is diverted to the second bed, and the first bed is taken out of service and the catalyst therein is replaced.

While the first bed is out of service the feed gas passes through only the second bed. After the catalyst in the first bed is replaced, the flow of gas exiting the second bed is directed to the first bed, and the process is continued in the manner described above, with the roles of the first and second beds being reversed.

The gas stream exiting section C may be sent directly to product via line 8, if it is substantially free of sulfur compounds; however, it still contains trace amounts of sulfur compounds, these can be removed by sending the gas stream through a polishing section, section D. Section D contains a metal oxide selected from copper oxide, zinc oxide or mixtures of these. These oxides are especially suitable for removing any sulfur compounds remaining in the gas stream. Since these metal oxides are more costly and less convenient to dispose of, it is preferred that as much of the sulfur impurities as possible be removed in the earlier sections of the system. These metal oxides are difficult to regenerate; accordingly they are preferably operated in a nonregenerable mode.

The polishing section reactors are usually operated at temperatures in the range of about 0° to about 300° C., and are preferably operated at about 20° to about 200° C. Accordingly, this section desirably includes heat exchange means to heat the effluent from the section C reactors prior to their entrance into the section D reactors.

As was the case with the reactors of section C, the system of section D can comprise a single reaction vessel or a battery of vessels operated in the lead-lag manner described above. The product exiting section D through line 6 is virtually free of sulfur compound impurities.

Figure 2:
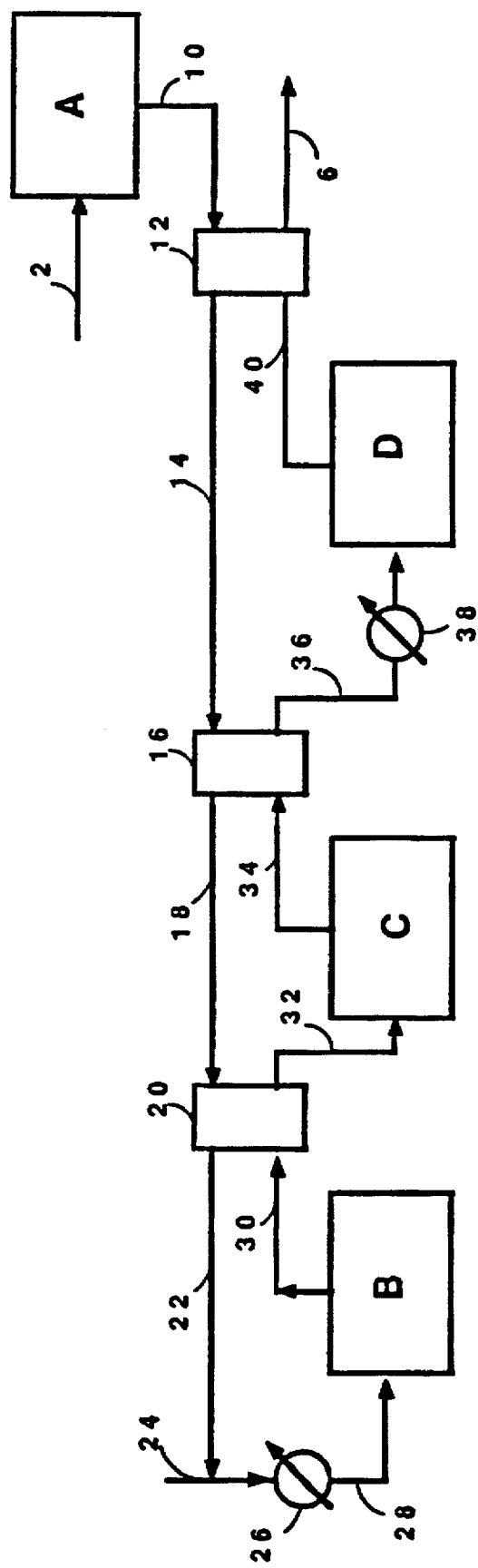
FIG. 2 illustrates, in a block diagram, an alternate embodiment of the system illustrated in FIG. 1.

FIG. 2 illustrates a more specific embodiment of the process of the invention. The system of FIG. 2 comprises sections A, B, C and D, described in the discussion of FIG. 1. The system of FIG. 2 additionally includes heat exchangers 12, 16 and 20 and auxiliary heaters 24 and 38. In the process of the invention, as practiced in the system of FIG. 2, impure carbon dioxide enters section A through line 2. After removal of any solid and gaseous impurities other than COS and hydrogen sulfide, and, perhaps other gaseous sulfides in section A, the gas stream passes via line 10 through exchanger 12, wherein it is heated to about 90° C. by heat exchange with the warm purified gas exiting section D. The warmed feed gas stream next passes via line 14 through heat exchanger 16, wherein it serves to heat up the gas stream exiting section C, and in the process is cooled to about 50° C. The feed gas then passes through line 18 and heat exchanger 20, where it is reheated to about 90° C. by exchange with the hot gas leaving COS hydrolysis section B. The reheated feed gas is then humidified, for example, by being mixed with steam introduced into line 22 through line 24. The humidified gas stream is then heated to about 100° C. in auxiliary heater 26 and passes into COS hydrolysis section B via line 28.

In section B any COS present in the gas stream is hydrolyzed to hydrogen sulfide and carbon dioxide, by contact with a suitable catalyst, such as alumina, as described above. The COS-free effluent from section B is then cooled to about 40° to 60° C. in heat exchanger 20 and is then introduced into section C, wherein it contacts a bed of particulate iron (III) oxide, which removes all but trace amounts of hydrogen sulfide from the gas. Prior to being introduced into section C, the gas stream may be passed through a condensate separator (not shown) to remove condensate which accumulates upon cooling of the humidified gas stream. The gas stream leaving section C is then heated by passage through heat exchanger 16 and auxiliary heater 38, and is next introduced into polishing section D at a temperature of about 100° C. In section D the gas stream contacts a bed of metal oxide, for example mixed copper-zinc oxides, which removes any remaining sulfur compounds. The gas exiting section C is substantially free of sulfur. By "substantially free of sulfur" is meant that the gas product meets the standard set for sulfur-free food grade, medical grade, and electronic grade carbon dioxide. The hot gas exiting section D next passes through heat exchanger 12 wherein it warms the feed gas and is itself cooled to about atmospheric temperature.

The invention is further illustrated by the following hypothetical example wherein, unless otherwise indicated parts, percentages and ratios are expressed on volume basis. In the example a system similar to that illustrated in FIG. 1 is used. The system is provided with heaters and coolers necessary to adjust the temperature of the various streams to the values indicated.

EXAMPLE

A carbon dioxide stream which is at a temperature of 30° C. and a pressure of 300 psig and which contains, as impurities, 330 ppm COS, 4 ppm hydrogen sulfide and trace quantities of organic compounds is used as the feed stream in this hypothetical example. The feed is first passed through a bed of activated carbon, which removes the trace organic compounds, and is then humidified by bubbling through a vessel of water. The humidified feed gas is then heated to 120° C. and passed through a COS hydrolysis reactor containing a bed of activated alumina. Greater than about 99% of the COS will be hydrolyzed to hydrogen sulfide and carbon dioxide. The gas stream is then cooled to about 30° C. and passed through a hydrogen sulfide removal unit containing a bed of iron oxide, which will remove substantially all of the hydrogen sulfide in the gas stream. The stream is next heated to a temperature of 100° C. and passed through a gas polishing reactor containing a zinc oxide-based catalyst. The gas stream exiting the polishing reactor will be substantially free of sulfur compounds.

Although the invention has been described with particular reference to specifically illustrated embodiments and to a specific experiment, it should be understood that the illustrated embodiments and the specific experiment are merely exemplary of the invention and variations are contemplated. For example, the process of the invention may be practiced in equipment arrangements other than those illustrated in the drawings. Similarly, the process can be used to remove other sulfur compounds from the feed gas stream, and other purifying steps can be incorporated into the process. The scope of the invention is limited only by the breadth of the appended claims.

What is claimed is:

1. A process for removing carbonyl sulfide from gaseous carbon dioxide comprising:

a. contacting gaseous carbon dioxide that contains carbonyl sulfide as an impurity with water vapor and a carbonyl sulfide hydrolysis catalyst which is activated alumina or a noble metal, thereby producing a gas mixture comprising hydrogen sulfide and carbon dioxide;

b. contacting said gas mixture with a bed of ferric oxide thereby removing hydrogen sulfide from said gas mixture and producing a gas stream comprised substantially of carbon dioxide but containing trace amounts of one or both of carbonyl sulfide and hydrogen sulfide;

c. contacting the gas stream leaving said bed of ferric oxide with a metal oxide selected from the group consisting of copper oxide, zinc oxide and mixtures thereof, thereby removing any carbonyl sulfide and hydrogen sulfide present in said gas stream.

2. The process of claim 1, wherein said ferric oxide is impregnated onto activated carbon.

3. The process of claim 1, wherein said hydrolysis catalyst is alumina.

4. The process of claim 1, wherein the metal oxide used in step (c) is copper-zinc mixed oxides.

5. The process of claim 1, wherein said gaseous carbon dioxide is subjected to a pre-purification step to remove hydrocarbon impurities therefrom.

* * * * *